United States Patent
Liao et al.

(10) Patent No.: US 10,214,431 B2
(45) Date of Patent: Feb. 26, 2019

(54) SYSTEM AND METHOD FOR UV-LED LIQUID MONITORING AND DISINFECTION

(71) Applicant: RayVio Corporation, Hayward, CA (US)

(72) Inventors: Yitao Liao, Hayward, CA (US); Robert Walker, Hayward, CA (US); Doug Collins, Hayward, CA (US); Theodore De Jony, Hayward, CA (US)

(73) Assignee: RAYVIO CORPORATION, Hayward, CA (US)

( * ) Notice: Subject to any disclaimer, the term of this patent is extended or adjusted under 35 U.S.C. 154(b) by 440 days.

(21) Appl. No.: 14/672,077

(22) Filed: Mar. 27, 2015

(65) Prior Publication Data

US 2016/0280562 A1 Sep. 29, 2016

(51) Int. Cl.
*C02F 1/00* (2006.01)
*C02F 1/72* (2006.01)
*C02F 1/32* (2006.01)

(52) U.S. Cl.
CPC ............. *C02F 1/008* (2013.01); *C02F 1/001* (2013.01); *C02F 1/004* (2013.01); *C02F 1/325* (2013.01); *C02F 1/725* (2013.01); *C02F 2201/008* (2013.01); *C02F 2201/3222* (2013.01); *C02F 2201/3227* (2013.01); *C02F 2209/001* (2013.01); *C02F 2209/003* (2013.01); *C02F 2209/008* (2013.01); *C02F 2209/08* (2013.01); *C02F 2209/11* (2013.01); *C02F 2209/15* (2013.01); *C02F 2209/20* (2013.01);

(Continued)

(58) Field of Classification Search
CPC .. C02F 1/00; C02F 1/001; C02F 1/008; C02F 1/004; C02F 1/325; C02F 1/725; C02F 1/72; C02F 1/32; C02F 2201/008; C02F 2201/009; C02F 2201/3222; C02F 2201/3227; C02F 2201/326; C02F 2209/001; C02F 2209/003; C02F 2209/008; C02F 2209/08; C02F 2209/11; C02F 2209/15; C02F 2209/20; C02F 2209/21; C02F 2209/36
USPC ......................................................... 210/93
See application file for complete search history.

(56) References Cited

U.S. PATENT DOCUMENTS

| | | | | |
|---|---|---|---|---|
| 7,550,746 B2* | 6/2009 | Tokhtuev | ........... | G01N 21/6402 250/461.1 |
| 8,529,770 B2* | 9/2013 | Yencho | ................... | C02F 1/325 210/143 |

(Continued)

*Primary Examiner* — Robert Clemente
*Assistant Examiner* — Akash K Varma
(74) *Attorney, Agent, or Firm* — Richard T. Ogawa

(57) ABSTRACT

An water providing apparatus includes a input portion for receiving untreated water, a treatment portion for treating and outputting treated water having a UV treatment module for reducing pathogens, a filtering mechanism for reducing physical and chemical impurities, a UV analysis module for determining levels of the impurities in the untreated water and for determining levels of impurities in the treated water, a processing unit for determining whether the levels of impurities in the treated water exceed a threshold, a reporting module for outputting the levels of the impurities in the untreated and treated water to a remote monitoring service, and a water output portion for providing the treated water if safe, and for inhibiting output of the treated water if unsafe.

21 Claims, 7 Drawing Sheets

(52) U.S. Cl.
CPC ...... *C02F 2209/21* (2013.01); *C02F 2305/10* (2013.01); *Y02W 10/37* (2015.05)

(56) References Cited

U.S. PATENT DOCUMENTS

| | | | |
|---|---|---|---|
| 8,797,523 B2* | 8/2014 | Clark | G01N 21/77 356/237.1 |
| 2002/0130069 A1* | 9/2002 | Moskoff | C02F 1/008 210/85 |
| 2014/0054222 A1* | 2/2014 | Clark | C02F 9/00 210/638 |

* cited by examiner

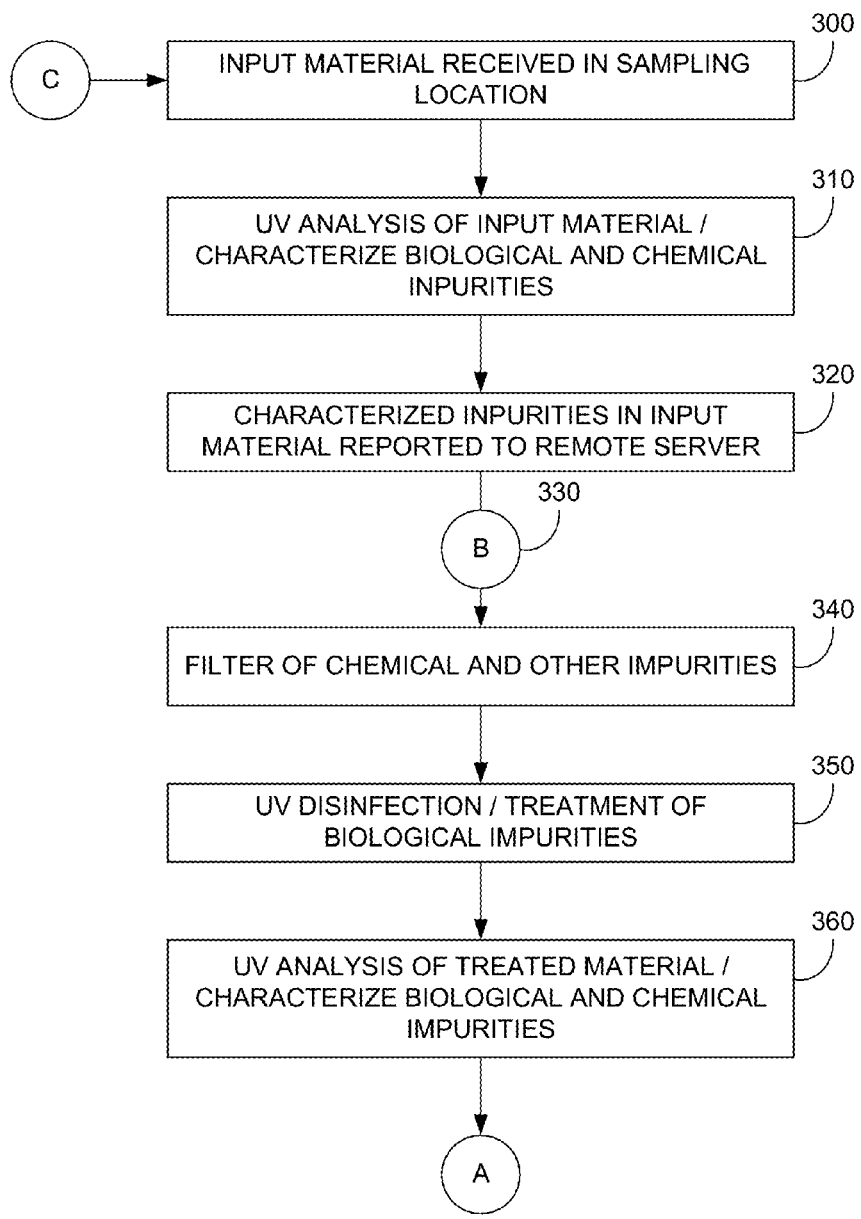
SAMPLING LOCATION  FIG. 2A

SAMPLING LOCATION

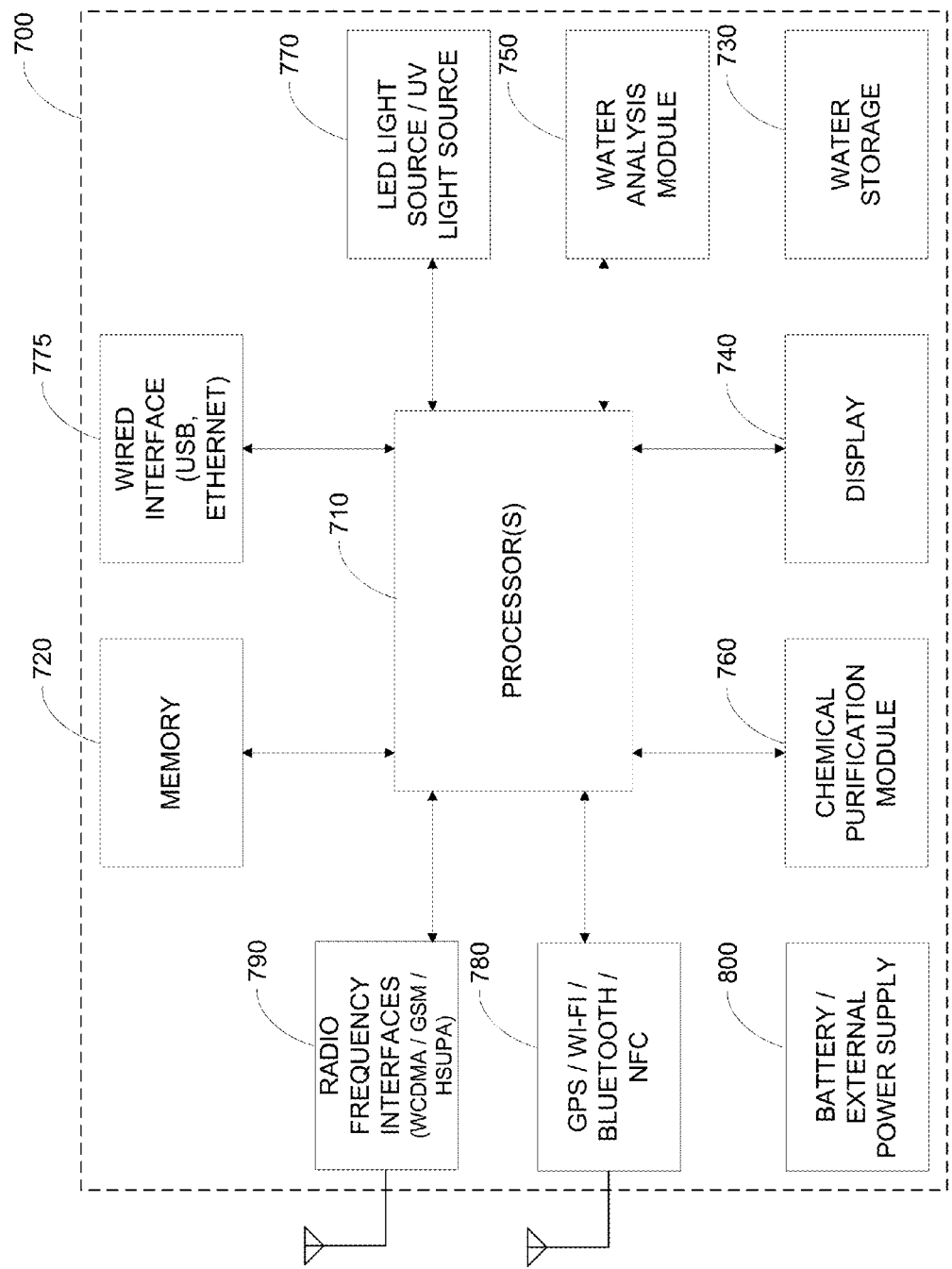

SYSTEM AND METHOD FOR UV-LED LIQUID MONITORING AND DISINFECTION

BACKGROUND OF THE INVENTION

The present invention relates to liquid monitoring. More specifically, embodiments of the present invention relate to a UV-LED liquid monitoring and purification systems and methods of operation.

Water suppliers periodically monitor water quality at centralized locations, such as water treatment plants, pump stations, and the like. The periodic testing is used to check whether the provided water meets certain health quality standards.

The inventors of the present invention believe that there are drawbacks to centralized testing systems including that water delivered to the end point (consumer), e.g. home, apartment, factory, or the like, may not have the same quality as provided by the supplier. Reasons for this deterioration in quality may include contamination within the distribution network (e.g. leaky pipes, pollution, sewage contamination, etc.); contamination within an end point (e.g. leaky pipes within a factory, chemicals leached from pipes, etc.); and the like. Another drawback is believed to be because water quality is not always monitored in real-time, contaminated water may be provided to consumers for some time, before the contamination is discovered.

From the above, it is desired to have a distributed water quality monitoring and treatment system without the drawbacks described above.

BRIEF SUMMARY OF THE INVENTION

The present invention relates to liquid treatment. More specifically, embodiments of the present invention relate to a UV-LED liquid treatment system and methods of operation. In various embodiments, the liquid may be water (e.g. tap water, bottled water, etc.), a fruit juice (e.g. orange juice, apple juice, cranberry juice, etc.), an electrolyte (e.g. Gatorade, etc.), a flavored water (e.g. soda, etc.), a soup base, or the like. For sake of convenience, embodiments described herein are directed to water, however, it should be understood that many other types of liquid may be treated, as described herein.

Various embodiments of the present invention include a water purification system (e.g. a water bottle, a water dispenser, an in-house water treatment system, or the like) that uses a combination of ultraviolet LEDs to kill bacteria, viruses, and spores in the incoming water. Optionally, the system includes $TiO_2$ (Titanium Dioxide), or $H_2O_2$ (Hydrogen peroxide) to work with UV LEDs to purify water via production of reactive oxygen species via a photo catalytic oxidation process. In general, it is contemplated that unsanitary water may include water of unknown-safety, pathogen-bearing water, or other types of liquid that if consumed by a human (or other animal) could cause illness and/or death. Additionally, the unsanitary water may also include one or more chemicals (e.g. metals, volatile organic chemicals and pesticides).

In various embodiments, a system may include some or all of the following elements: a) water analysis module, b) a physical/chemical water treatment portion, c) a UV treatment portion, d) a reservoir portion d) a communication portion, e) a filtration module, f) battery module and g) driver electronics. Some systems are used to monitor and treat water incoming to a residence, facility, or the like (e.g. water treatment unit), or treat water prior to consumption or use (e.g. water pitcher or a water bottle). In some embodiments, water quality analysis is performed upon incoming water to a user. The water quality may be analyzed for chemical contaminants and/or pathogens; the water quality may be analyzed for optical transparency and/or optical absorption; the water quality may be analyzed for optical spectroscopy and/or florescence spectroscopy. In various embodiments, the water quality may also be analyzed before and after treatment. Water purification may be performed upon the water. The purification may include filtering of suspended particulates, removal or break down of chemical impurities, and/or destruction of pathogens (e.g. bacterial or viral). In some cases the purification may be tailored to the impurities that were just determined. In various embodiments, an additional analysis may be performed upon the purified water. The initial analysis of the incoming water and/or the final analysis of the treated water may be sent via the communication portion to a centralized reporting server, e.g. the water provider, a governmental agency, or other third party monitoring agency.

In various embodiments, a communication portion may include a communication system based upon Bluetooth, WiFi, 4G, 3G, NFC, RF, Ethernet, or the like. The communication portion may directly communicate to a cloud-based reporting server via WiFi, 4G, 3G, Ethernet, or the like. In other embodiments, the communication portion communicates via Bluetooth, NFC, IR, ZigBee or other rf protocol to a smart device (e.g. smart phone, home PC, home server, or the like) having one or more specialized software applications running thereon. In various embodiments, the water data may be stored within the applications, processed and viewed by the user on the smart device. For example, the user may see time trends in the water turbidity, the types of contaminants detected in the water, and the like. In some embodiments, the data may automatically or manually uploaded to the centralized reporting server from the application. For example, the user's application may periodically upload the water quality data captured, as described herein.

In various embodiments, a centralized reporting server receives and stores water quality reports from a multitude of users in real-time or non-real time. Based upon the real-time and/or non-real time data and based upon knowledge of the water distribution network, near-real time identification of water quality problems may be determined. Causes for the water quality problems may then be investigated, and fixes to the distribution network, modifications to the outgoing water treatment, and other actions may be taken. Further, based upon knowledge of the water distribution network and the water quality reports, over time, trends in water quality may be determined. Based upon the trends, a water provider may change its water purification procedures (e.g. add additional chemical removal steps); may determine water branches having unusual contaminants, inspect the water branches, and/or repair faulty water branches; may shut-off water provided to specific branches or shut-off water from specific sources when contaminants exceed the purification capabilities; may modify conditions around aquifers and other water sources, and the like.

According to one aspect of the invention, an apparatus for providing water is disclosed. One device includes a water input portion configured to receive untreated water having biological and chemical impurities, and a water treatment portion configured to receive the untreated water and to output treated water. In some embodiments, a water treatment portion includes a UV disinfection/treatment module configured to reduce the biological impurities in the untreated water, and a filtering mechanism configured to reduce the chemical impurities in the untreated water. A system may include a UV analysis module configured to determine initial levels of the biological impurities and the chemical impurities in the untreated water and to determine treated levels of the biological impurities and chemical impurities in the treated water, or the optical transmittance of the untreated water, or the optical absorbance of the untreated water, and a processing unit coupled to the UV analysis module, wherein the processing unit is configured to determine whether the treated levels of the biological impurities or the chemical impurities in the treated water exceed at least one threshold and to provide a impurity signal in response thereto. An apparatus may include a reporting module coupled to the processing unit, wherein the reporting module is configured to output the initial levels of the biological impurities and the chemical impurities and the treated levels of the biological impurities and the chemical impurities to a remote monitoring service, and a water output portion coupled to processing unit, wherein the output portion is configured to allow output of the treated water, and wherein the output portion is configured to inhibit output of the treated water in response to the impurity signal.

According to one aspect of the invention, a water monitoring system is disclosed. A system may include a plurality of water quality monitoring devices located at a plurality of geographically remote locations. In some aspects, water quality monitoring devices include a water input portion configured to receive untreated water having biological and chemical impurities, and a water treatment portion configured to receive the untreated water and to output treated water. Some devices may include a UV disinfection/treatment module configured to reduce the biological impurities in the untreated water, and a filtering mechanism configured to reduce the chemical impurities in the untreated water. Some devices may include a UV analysis module configured to determine initial levels of the biological impurities and the chemical impurities in the untreated water and to determine treated levels of the biological impurities and chemical impurities in the treated water, and a processing unit coupled to the UV analysis module, wherein the processing unit is configured to determine whether the treated levels of the biological impurities or the chemical impurities in the treated water exceed at least one threshold and to provide a impurity signal in response thereto. Some devices include a reporting module coupled to the processing unit, wherein the reporting module is configured to output data comprising the initial levels of the biological impurities and the chemical impurities and the treated levels of the biological impurities and the chemical impurities to a centralized server, and a water output portion coupled to processing unit, wherein the output portion is configured to allow output of the treated water, and wherein the output portion is configured to inhibit output of the treated water in response to the impurity signal. In some embodiments, a system includes the centralized server coupled to each of the plurality of water quality monitoring devices, wherein the centralized monitoring unit is configured to receive the data from each of the plurality of water quality monitoring devices, wherein the centralized server is determine whether the initial levels of the biological impurities and the chemical impurities exceeds initial level thresholds or determine whether the treated levels of the biological impurities and the chemical exceed treated level thresholds and to generate an action signal in response thereto, and wherein the centralized server is configured to determine a corrective action in response to the action signal.

According to another aspect of the invention, a water monitoring and treatment module is disclosed. The system may include a case with an opening, and a lid that fits tightly into the opening of the case, where when water is filled into the case and when the lid fits on the case, water does not leak away from the case. In some embodiments, the interior the case is coated with material that reacts with UV via a photo catalytic process, such as $TiO2$ (e.g. P-25 by Degussa, PC 500 by Millennium, or any other material comprising Anatase and/or Rutile). In various embodiments, the catalyst may be in the form of a nanoparticle, thin film, microsphere, or the like. The case has may include a region, e.g. on the side, on the top, on the bottom, where a UV fluorescent material is provided. In operation, that UV fluorescent material glows or emits light in the visible spectrum when the water is under UV irradiation. In some embodiments, other types of indicators may be used when the water is exposed to UV light. In various embodiments, the case includes an interior opening a at the bottom, where UV irradiation is supplied by a plurality of UV LEDs located below the bottom of the water containing area; the UV LEDs are powered by a battery. The battery is typically coupled to UV LED driver electronics, a communication wireless module, and the like. In some embodiments, the interior of the case has a photodiode detector placed in the line of sight of the UV-LED irradiation direction to help determine water clarity, amount of water present, presence of UV irradiation, or the like. In some embodiments, the case also has an electronic display region on the exterior that indicates the presence of UV irradiation.

Various additional objects, features and advantages of the present invention can be more fully appreciated with reference to the detailed description and accompanying drawings that follow

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 2A-B illustrate a block diagram of a flow chart according to some embodiments of the present invention;

FIG. 4 illustrates a block diagram of portions of various embodiments of the present invention.

DETAILED DESCRIPTION OF THE INVENTION

Figure 1:
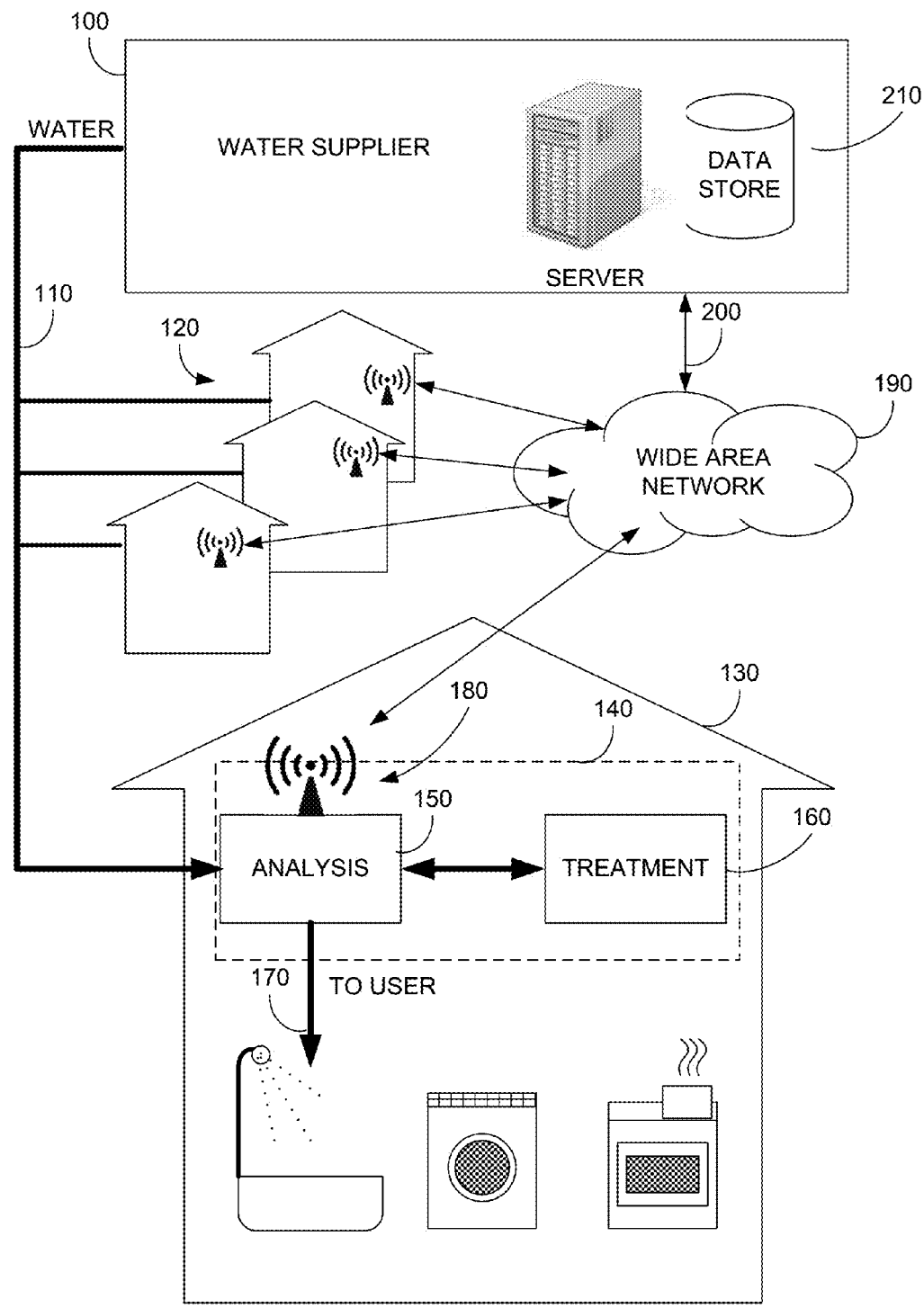
FIG. 1 illustrates a system diagram of various embodiments of the present invention.

FIG. 1 illustrates an embodiment of the present invention. More specifically, FIG. 1 illustrates a water supplier 100 supplying water 110 to water customers 120. Within a typical water customer 130, a is provided. In the present example, device 140 includes a water analysis device 150 and a water treatment device 160. As will be discussed further below, water analysis device 150 can perform an impurity analysis or optical transmittance, or optical absorbance analysis on incoming water 110, and water treatment device 160 can treat incoming water 110 and output treated water 170. Water analysis device 150 can also perform an impurity analysis or optical transmittance, or optical absorbance analysis on the treated water 170. If the treated water 170 is within predetermined impurity thresholds, it may be provided to the user, and in some embodiments, if the treated water exceeds the predetermined impurity thresholds, the treated water 170 will not be provided to the user.

In the embodiments illustrated in FIG. 1, water customers 120 each have a device 140 installed that performs the analysis and treatment functionality. As shown, each device 140 includes a wired or wireless communication portion 180 which can transmit data via a wide area network 190, back to water supplier 100. In various embodiments, the data may include an impurity analysis or optical transmittance, or optical absorbance analysis of the incoming water 110 and/or the treated water. As illustrated, the data 200 can be stored in a data store 210 associated with water supplier 100. In other embodiments, data store 210 may be associated with a third-party not associated with water supplier 100, such as a local water control agency, the EPA, a governmental body, a non-governmental organization, a commercial company, a non-profit organization, or the like.

Figure 2B:
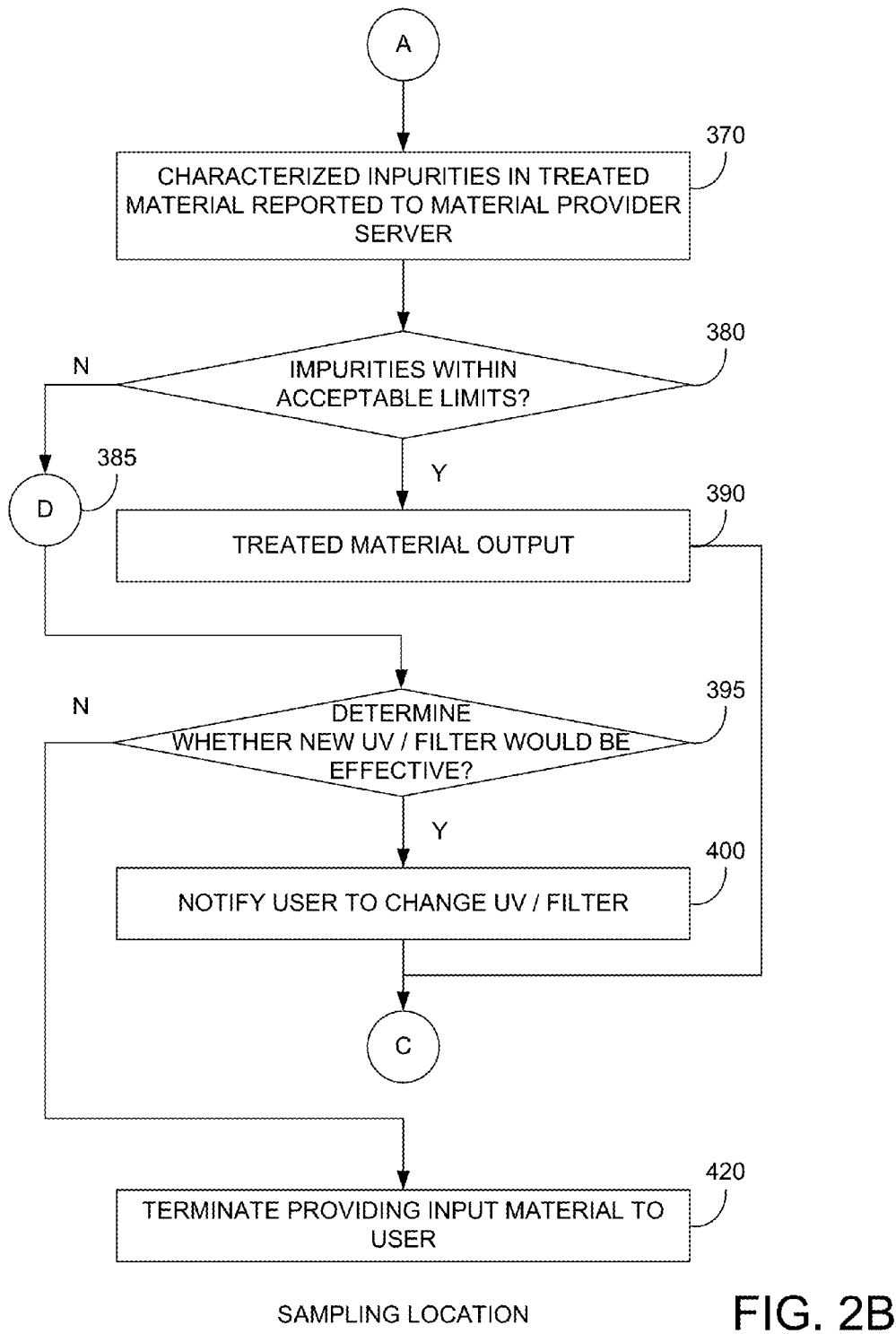

FIGS. 2A-B illustrate a flow diagram according to various embodiments of the present invention. More specifically, FIGS. 2A-B illustrate an example of a process performed at a typical water customer location, such as water customer 130, in FIG. 1. Initially water is provided to water customer 130, step 300. In other embodiments, water may be replaced with other fluids, such as gasoline, or other liquid, or beverage, and the customers may be companies, power plants, or the like.

In various embodiments, when device 140 receives the input water, an initial analysis can be performed, step 310 (optional). In various embodiments, one or more UV LEDs (with emission peak wavelength in the spectral range between 210 nm and 280 nm, or between 270 nm and 340 nm, or between 330 nm and 395 nm, or the like) may be used to illuminate the input water, and one or more optical sensors (such as, a photodiode, a photo detector, a spectrometer, or the like) may be used to detect responses to the UV illumination. In some embodiments, UV LEDs being developed by the assignee of the present invention may be used to illuminate the input water sample with UV light within a range of wavelengths from about 210 nm to about 365 nm, among other possible wavelengths, such as 385 nm. The UV LEDs may include some UV LEDs having a peak at about 280 nm, some UV LEDs having a peak at about 320 nm, or the like. By having multiple peaks of UV wavelengths, biological impurities having different response characteristics may be determined. For instance, different wavelength LEDs may be individually turned on by using a LED driver system that can pulse through a combination of UV LED wavelengths (frequency) peaked from 254 nm, 265 nm, 280 nm, 310 nm to 365 nm. For example, viruses may respond to a first UV LED characterized by a first UV frequency, bacteria may respond to a second UV LED characterized by a second UV frequency, and the like. In various embodiments, biological contaminants may include *cryptosporidium*, giardia, *legionella*, coliform, viruses, and the like), or in another embodiment, contaminations can be suspended solids or particles in the water.

In response to the UV illumination, biological impurities may respond with characteristic responses. For example, pathogens that are exposed to first UV frequency light may reflect the UV frequency light, other impurities that are exposed to second UV frequency light may fluoresce, and the like. In some embodiments, the intensity of the responses as well as the wavelength are recorded.

In various embodiments, other types of testing may be performed upon the input water to determine chemical impurities (e.g. chlorine, lead, arsenic, organic compounds). For example, it is believed that methods for testing levels of lead, arsenic, and other harmful chemicals, are well-known, and can be used with embodiments of the present invention.

In various embodiments, the wavelengths of the responses to the UV illumination may be correlated to particular biological impurities, and the intensities may be correlated to the amount/percentage of the biological impurities. Further, based upon the chemical impurity analysis, the amount/percentage of the chemical impurities can be determined. The amount/percentage of the biological impurities and chemical impurities can then be sent back to the water provider, step 320, as illustrated in FIG. 1.

In some embodiments, step 310 may simply include using a UV light source to illuminate the water and a UV light detector to determining the turbidity or clarity of the water. In other embodiments, step 320 need not be performed, or may be performed at a later time.

Figure 3A:
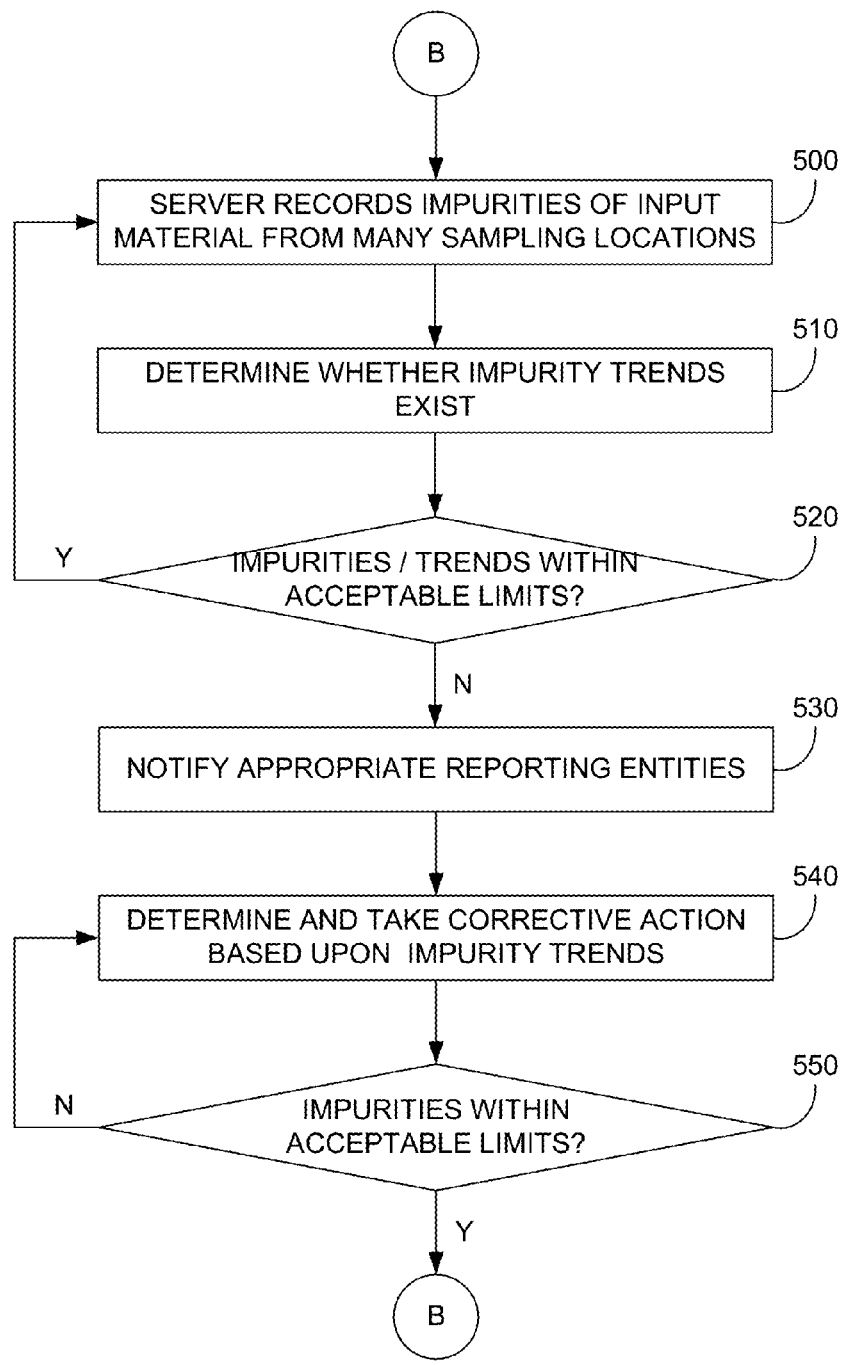
FIGS. 3A-B illustrate another block diagram of a flow chart according to some embodiments of the present invention.
Figure 3B:
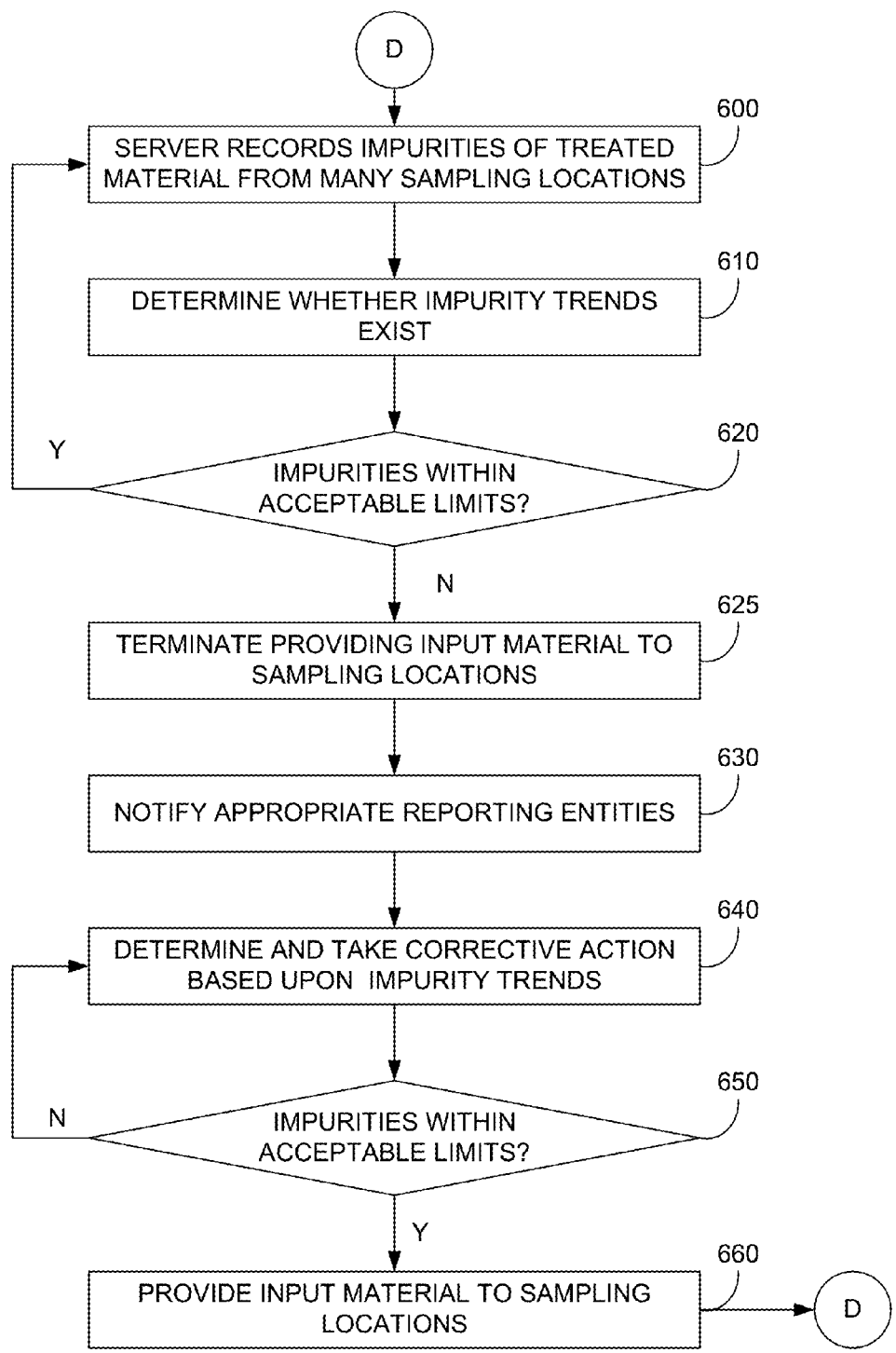

In FIG. 2A, after step 320, the processes illustrated in FIGS. 3A-B, step 330, may be performed at the same time or at different times (asynchronously) from the remaining steps in FIGS. 2A-B.

Next, in various embodiments, a dedicated UV disinfection/treatment process may be performed, step 350 and a dedicated filtering process may be performed, step 340. In some embodiments, the UV disinfection or treatment process may also include UV LEDs currently under development by the present assignee. For example, UV LEDs having different UV frequency peaks, e.g. 220 nm, 240 nm, 260 nm, 320 nm, 340 nm, 365 nm, 375 nm, etc. may irradiate the input water. In some embodiments, the power output or intensity of the UV LEDs may be flat across the desired UV frequency range. In other embodiments, the power output of the UV LEDs may depend upon the type of biological contaminants that were determined in step 310, above. For example, if only viruses are determined, only UV LEDs having a peak of about 254 nm may be activated in step 350.

In some embodiments, in step 350 UV irradiation of the water, or liquid, may be performed in conjunction with a catalyst, such as TiO2, as mentioned above. TiO2 is selected as a catalyst because it is non-toxic, stable, has no smell, is not soluble in water, but reacts strongly with UV light. In such embodiments, UV illumination in the UV-A bans may irradiate an inner surface, or other element in the water that has a coating of TiO2. In response to the UV-A (from about 250 to about 400, especially around 340 nm) irradiation, the TiO2 will produce one or more water byproducts, such as reactive oxygen species. It is expected that many pathogens (e.g. viruses, bacteria, fungi, algae, cancer, *E. coli*, etc.) and harmful chemicals (e.g. antibiotics, artificial dies, pesticides, herbicides, pharmaceuticals, etc.) that are exposed to active oxygen species will be neutralized. In light of the above disclosure, other catalysts can be used and are considered within the scope of embodiments of the present invention.

In various embodiments, the dedicated filtering process of step 340 may be non-selective and not dependent upon the types of chemical impurities determined in step 310, above. For example, the filtering process may include activated charcoal to absorb any chlorine or organic compound in the input water.

In various embodiments, step 340 or a similar step may be performed prior to step 310. In such embodiments, for example, characterization (UV, white light, etc.) of the water is performed after filtering out certain contaminants, impurities, suspended particles, or the like. These particles may inhibit the use of UV light for decontamination purposes, accordingly, filtering out of particulates may be performed prior to characterization. In such embodiments, step 310 may determine whether the water can be treated by UV light, or whether the water is too cloudy. If the water is too cloudy, the UV disinfection/treatment in step 350 may not be effective. Accordingly, if the water is too cloudy, in step 380 etc., below, the water may be deemed unfit for disinfection, treatment and for consumption (or other use), step 420.

In various embodiments, the treated water can again be tested for biological and/or chemical impurities, step 360. This step may be performed with the same analysis module that performs step 310, above. In other embodiments, two analyses modules may be used, one for input water and one for treated water. Various embodiments allow water to flow relatively freely from the input water, through embodiments of the present invention, and to the treated water.

Next, the analysis data on the treated water may be sent to the remote server in step 370. In some embodiments, the analysis data of the input and treated water may be sent to the remote server together in this step. As mentioned previously, the remote server may take the analysis data and perform actions asynchronously from the steps described in FIGS. 2A-B. In some embodiments, the water analysis data maybe compared with data acquired at other user/customer locations globally, and feedback to the user/customer as indication of the local water quality.

In various embodiments, a processing module may review the analysis data of step 360 to determine whether one or more contaminants exceed a predetermined threshold for a contaminant, step 380. For example, based upon the UV analysis in step 360, it may be determined whether *cryptosporidium* is detected in the treated water. If not, the treated water may be allowed to flow to the user, step 390.

In various embodiments, if one or more contaminants are detected in the treated water, a notification is made to the water server, step 385, and a determination is made as to whether the UV disinfection or treatment of step 350 and filtering of step 340 should have remove the impurity, step 395. If so, a determination is made whether the UV disinfection/treatment module and/or the filtering module of steps 340 and 350 need to be replaced, step 400. If so, in step 410, the user may be directed to replace one or more of these modules, e.g. replace the activated charcoal filtering mechanism, or the like.

In some embodiments, a determination is made that the treated water is not able to be treated effectively, the water flow may be stopped, step 420. In other embodiments, the treated water may continue to flow to the user, but the user may be made aware that the treated water is not safe to drink directly out the tap. In some embodiments, one or more indicator lights may be illuminated to provide the signal to the user. In other embodiments, one or more text messages may automatically be sent to the user when the water contains unacceptable levels of impurities.

FIG. 3A-B illustrates various embodiments of the present invention. More specifically, the processes may be performed by a server associated material (e.g. water) supplier, a regulation agency, or other third party organization.

As was illustrated in FIG. 1, it is contemplated that multiple users have embodiments of the present invention, and these multiple perform analyses upon the incoming water (e.g. step 320, FIG. 2A), and report the results to the server in step 330, FIG. 2A. In FIG. 3A, the analyses upon the input water is received by the centralized server, step 500.

In various embodiments, the centralized server may determine whether there are any positive or negative contamination trends in the water received by users, step 510. In some embodiments, this may also be determined based upon currently received data, historical data, and/or other data previously gathered by the centralized server. In various embodiments, if the impurities/trends do not exceed certain limits, step 520, the process may return to monitoring incoming samples.

In various embodiments, when provided water exceeds the standards, notification may be sent to the water supplier management, governmental authorities, other monitoring group, water consumers, step 530. The notification may be via e-mail, text, text message, phone call, or the like. As an example, if a factory discharges a hazardous chemical into a water supply, when embodiments of the present invention located at a user's home detect the hazardous chemical, using the steps described above, Governmental authorities or the water supplier may activate an emergency notification system to automatically alert water customers that they should not use the water.

In response to determining there is a problem with the water provided to consumers, one or more corrective actions may be taken by the water supplier, step 540, until the water returns to an acceptable water quality, step 550. Many conventional methods for treat the water, prior to providing to the user, are contemplated, for example, adding additional chemicals (e.g. chlorine); shifting sources of water (e.g. from lake to well water); locating and reducing of sources of contamination (e.g. factories, agricultural run-off, sewage); and the like. Such actions may be short-range actions and/or long range actions.

As was illustrated in FIG. 1, it is contemplated that multiple users have embodiments of the present invention, and these multiple perform analyses upon the treated water (e.g. steps 340-350, FIG. 2A), and report the results to the server in step 385, FIG. 2B. In FIG. 3B, the analyses upon the input water is received by the centralized server, step 500.

In various embodiments, similar to the steps in FIG. 3A, the centralized server may determine whether there are any positive or negative contamination trends in the water received by users, step 610. In some embodiments, this may also be determined based upon currently received data, historical data, and/or other data previously gathered by the centralized server. In various embodiments, if the impurities/trends do not exceed certain limits, step 620, the process may return to monitoring incoming samples.

In various embodiments, when provided water exceeds the standards, the water supply may be automatically shut-off to one or more water customers, step 625. Additionally, notification may be sent to the water supplier management, governmental authorities, other monitoring group, water consumers, step 630. Again, the notification may be via e-mail, text, text message, phone call, or the like. As an example, if a factory discharges a hazardous chemical into a water supply, when embodiments of the present invention located at a user's home detect the hazardous chemical, within the treated water, Governmental authorities or the water supplier may activate an emergency notification system to automatically alert water customers that they should not use the water. In contrast to the process described in FIG. 3A, the focus within FIG. 3B is water that cannot be effectively treated by embodiments of the present invention.

In response to determining there is a problem with the water provided to consumers, one or more corrective actions may be taken by the water supplier, step 640, until the water returns to an acceptable water quality, step 650. In the short range, this may include replacing the water purification portions of embodiments of the present invention, at each water customer site. For example, replacing activated carbon filters, replacing particulate filters, adding additional UV light sources, and the like, step 660. Many conventional methods for treat the water, prior to providing to the user, are also contemplated, for example, adding additional chemicals (e.g. chlorine); shifting sources of water (e.g. from lake to well water); locating and reducing of sources of contamination (e.g. factories, agricultural run-off, sewage); and the like.

In various embodiments, device 140 in FIG. 1 may be embodied as a water treatment device such as a water filter in a garage or under the sink, a table top device, a water pitcher, a water bottle (e.g. sports bottle) or the like. As an example, a water pitcher or water bottle may be based upon the design described in U.S. Pat. No. 8,816,300 issued Aug. 26, 2014 and assigned to the present assignee.

FIG. 4 illustrates a functional block diagram of various embodiments of the present invention. In FIG. 4, a device 700 typically includes an applications processor 710, memory 720, a display or other visual indicator 740, water analysis module 750, physical and chemical purification modules 760, UV purification modules 770, a treated water holding tank 730, and the like. Remote communications from and to device 700 can be provided by alternatively provided by a wired interface 775, a GPS/Wi-Fi/Bluetooth interface 780, RF interfaces 790, or the like. As illustrated, the above modules may communicate via an internal communication mechanism.

Typically, computing device 700 may include one or more processors 710. Such processors 710 may also be termed application processors, and may include a processor core, a video/graphics core, and other cores. Processors 710 may be a processor from Apple (S1), Intel (Quark SE), NVidia (Tegra K1, X1), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Other processing capability may include audio processors, interface controllers, and the like. It is contemplated that other existing and/or later-developed processors may be used in various embodiments of the present invention, including processors having greater processing capability (e.g. Intel Core)

In various embodiments, memory 720 may include different types of memory (including memory controllers), such as flash memory (e.g. NOR, NAND), pseudo SRAM, DDR SDRAM, or the like. Memory 720 may be fixed within computing device 700 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, display 730 may be based upon a variety of current or later display technology including displays having touch-response, (e.g. resistive displays, capacitive displays, optical sensor displays, electromagnetic resonance, or the like). Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, water analysis module 750 may include multiple UV-LED light sources, each having unique UV light output frequencies, and one or more optical sensors. In various embodiment, UV-LED light sources have a relative narrow output peak (e.g. on the order of 20 nm), and are embodied as UV-LEDs currently being developed by the current assignee of the present application. The narrow output peaks allows embodiments of the present invention to differentiate between different types of contaminants and impurities. For example 210 nm to 250 nm range can detect Nitrites (NO2) and Nitrates (NO3), 250 nm to 380 nm can detect Total Organic Carbon (TOC), Dissolved Organic Carbon (DOC), Chemical Oxygen Demand (COD), Biochemical Oxygen Demand (BOD), Color (Hazen), Assimilable Organic Carbon (AOC, 240 nm and 300 nm range can detect Ozone, 360 to 395 nm can detect Benzene, Toluene and Xylene (BTX) and Turbidity (NTU) and the like. In some embodiments, a single water analysis module 750 may only analyze purified water, or may analyze incoming and purified water. In other embodiments, two water analysis modules 750 are provided, one for incoming water, and one for purified (treated) water.

In various embodiments, mechanical/chemical purification module 760 may include one or more porous membranes to filter-out contaminants particles suspended in the water. Additionally, module 760 may include any number of chemicals to reduce chemical contaminants in the water. In some examples, module 760 may include an activated charcoal filter to reduce chlorine and TOC (total organic carbon), DOC (dissolved organic carbon), COD (chemical oxygen demand), TOC, DOC and COD and the like. In various embodiments, incoming water is treated with module 760 prior to treatment with UV module 770.

In various embodiments, UV module 770 may be expose the water to different ranges of UV light to destroy different types of pathogens. For example, UV light in the 214 nm range is used to destroy MS2 coliphage, UV light in the 265 nm range is used to destroy *B. subtilis* and the like. In some embodiments, UV module 770 may also include embodiments of UV-LEDs under development by the current assignee. Such embodiments may directly target the pathogens determined in water analysis module 750 on the incoming water. For example, if only *B. subtilis* is detected in module 750, only UV-LEDs having an output range of about 260 nm to about 270 nm can be activated, to attack the *B. subtilis*. In other embodiments, a broad-band UV light source, e.g. medium pressure UV bulb may also be used, to purify the water, regardless of whether any pathogens are detected.

In some embodiments, a photo detector, such as a photodiode, or a PMT (photomultiplier), or a spectrometer, can be used in the system to monitor optical signal generated by the UV-LED when transmitted through the water.

In some embodiments, GPS receiving capability may also be included in various embodiments of the present invention, however is not required. The GPS functionality may provide the remote server with the geographic location of device 700.

FIG. 4 is representative of one computing device 700 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 4. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. For example, device 700 may be powered by any number of sources 800 including: AC from a wall outlet, solar-derived power, battery, manual crank or the like.

Figure 5:
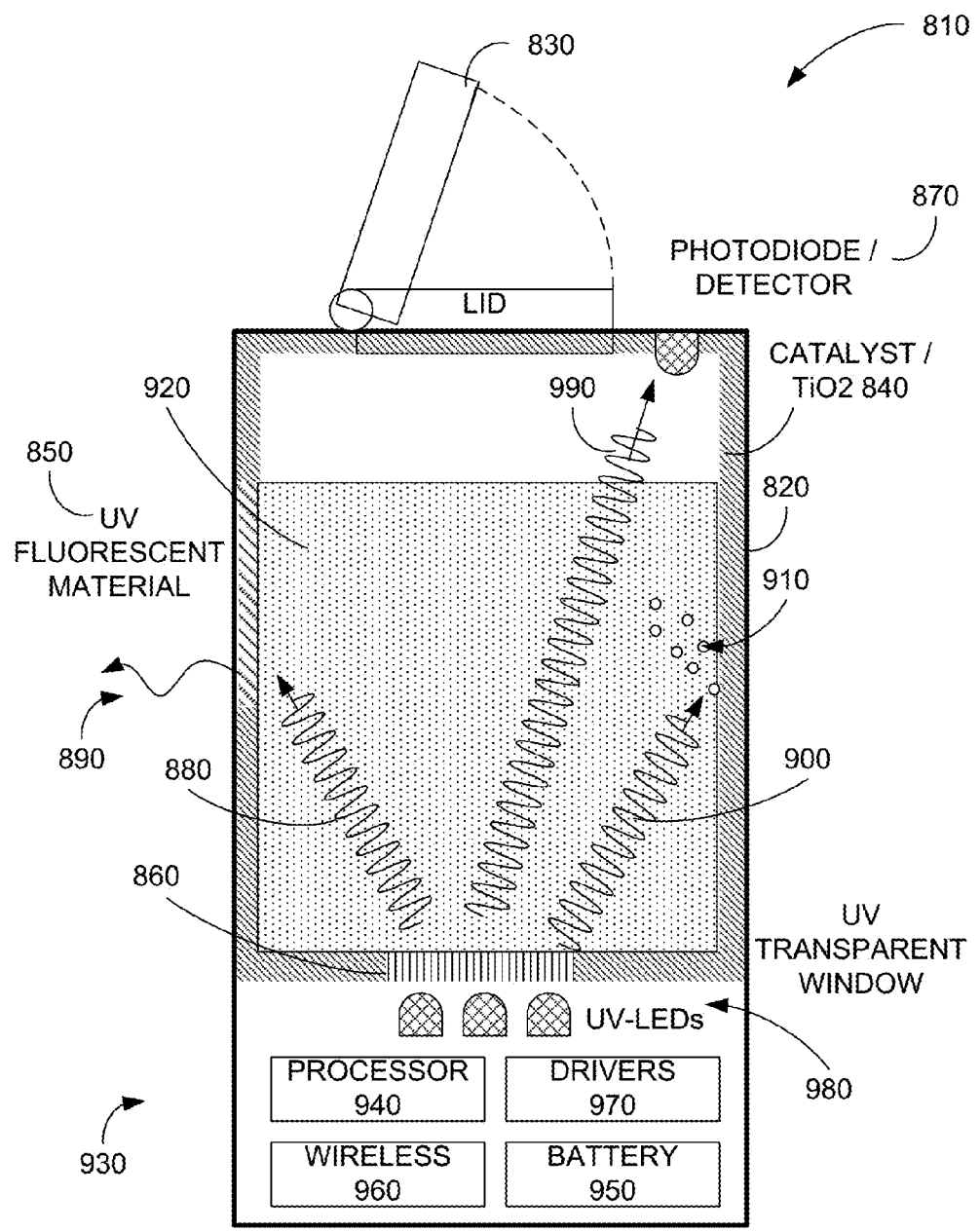
FIG. 5 illustrates cross-section of various embodiments of the present invention.

FIG. 5 illustrates an example of another embodiment of the present invention. In this example, a portable water bottle 810 is illustrated. Water bottle 810 includes an external housing having an opening 830, and an inner watertight housing 840. External housing may be a metal or metal alloy, glass, a translucent material, or other UV blocking material. In some embodiments, opening 830 may include a filter for incoming water. In various examples, as mentioned above, inner housing 840 may include a coating of a catalyst, such as TiO2, or the like. The inner housing 840 may include a UV fluorescent material region 850, a UV transmissive region 860, an a photo detector 870. In various embodiments, electronic components are disposed in a bottom portion 930 of water bottle 810. As was discussed above, various components may be provided, such as a processor 940, a power supply 950, a wired or wireless communication interface 960, LED drivers 970, and one or more UV-LEDs 980. In various embodiments, UV-LEDs 980 may include UV-A and/or UV-B LEDs or the like.

In various embodiments, as illustrated, in response to UV illumination 880, UV fluorescent material 850 provides visible light 890, which can be seen by a user. In some embodiments, material 850 may be in the shape of a logo, pattern, special design, or the like. The design would appear to glow when UV illumination 880 was present. Additionally, in response to UV illumination 900, the catalyst on inner housing 840 generates reactive oxygen species 910 within the liquid (e.g. water) 920. Additionally, as illustrated, UV or white light illumination 990 passes through liquid 920 and strikes photo detector (photo diode or spectrometer) 870. In various embodiments discussed above, the intensity of light indicates the clarity or turbidity of liquid 920. In some embodiments, various types of optical properties may be measured, such as optical transmission, optical absorption, optical reflectance, and optical fluorescence, and the like. Depending upon the intensity of detected light, the time for the UV sanitizing process may be modified (e.g. increased or decreased); the intensity of the UV LEDs may be modified; the UV sanitizing process may be aborted; and the like.

In various embodiments, water bottle 810 may transmit the turbidity data, the UV sanitization parameters, and the like through wireless interface 960 to a remote destination. For example, the data may be sent to a third-party remote server; to a user's smart device or home computer; or the like.

In other embodiments, combinations or sub-combinations of the above disclosed invention can be advantageously made. For example, in FIG. 5, one or more UV wave guides may extend from the bottom surface of inner housing 840 into liquid 920. Such embodiments could increase the diffusion of UV light within inner housing 840. In another embodiment, the filter in the filtration process may include TiO2 material inside, where upon water will flow through the filter and be exposed to the surface of the TiO2 material (TiO2 nano particle, thin film, micro sphere, powder, etc.) UV light may be optionally delivered to the TiO2 material located inside the filter via light guiding technology, such as optical fiber or optical light guide blades. Such embodiments will increase the surface area of the TiO2 material exposed to the liquid, thus the oxidation capability will increase. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. An apparatus for providing water comprises:
   a water input portion configured to receive untreated water;
   a water disinfection portion configured to receive the untreated water and to output treated water for human consumption comprising:
   a filtering mechanism configured to reduce chemical impurities in the untreated water;
   a UV analysis module configured to determine initial optical properties of the untreated water and to determine treated optical properties of the treated water;
   a processing unit coupled to the UV analysis module, wherein the processing unit is configured to determine whether the initial optical properties of the untreated water exceed at least one threshold and to provide an impurity signal in response thereto, and configured to determine UV output parameters in response to the initial optical properties of the untreated water;
   a UV disinfection module coupled to the processing unit, wherein the UV disinfection module is configured to provide UV light to the untreated water to reduce biological impurities from the untreated water and to form the treated water in response to the UV output parameters;
   a reporting module coupled to the processing unit, wherein the reporting module is configured to output the initial optical properties of the untreated water and the treated optical properties of the treated water to a remote monitoring service.

2. The apparatus of claim 1 further comprising:
   a water output portion coupled to the processing unit, wherein the output portion is configured to allow output of the treated water for human consumption, and wherein the output portion is configured to inhibit output of the treated water for use in response to an impurity signal.

3. The apparatus of claim 1 further comprising:
   a water container configured to store the treated water;
   a housing configured to house the water container, the water disinfection portion, the UV analysis module, the processing unit, and the reporting module; and
   wherein the apparatus is portable.

4. The apparatus of claim 1 further comprising:
a base unit housing configured to house the processing unit, and the reporting module; and
a water dispenser removably disposable upon the base unit, wherein the water dispenser comprises a water container configured to store the treated water, wherein the water dispenser is configured to house the water disinfection portion.

5. The apparatus of claim 1
wherein the processing unit is configured to periodically provide an initiation signal; and
wherein the UV analysis module is configured to determine the initial levels and the treated levels in response to the initiation signals.

6. The apparatus of claim 1 wherein the reporting module comprises a wireless communication module selected from a group consisting of: a mobile telecommunications standard, Bluetooth, Wi-Fi, 802.11, NFC.

7. The apparatus of claim 1 wherein the UV disinfection module comprises UV LEDs configured to output UV light within a range of about 100 nm to about 300 nm.

8. The apparatus of claim 1 wherein the UV analysis module comprises:
a plurality of UV LEDs including a first UV LED and a second UV LED, wherein an output peak frequency of the first UV LED is different from an output peak frequency of the second UV LED.

9. The apparatus of claim 1 wherein the UV disinfection module comprises:
a plurality of UV LEDs including a first UV LED and a second UV LED, wherein an output peak frequency of the first UV LED is different from an output peak frequency of the second UV LED.

10. A water monitoring system comprises:
a plurality of water quality monitoring devices located at a plurality of geographically remote locations, wherein each water quality monitoring device comprises:
a water input portion configured to receive untreated water;
a water disinfection portion configured to receive the untreated water and to output treated water for human consumption comprising:
a filtering mechanism configured to reduce chemical impurities in the untreated water;
a UV analysis module configured to determine initial optical properties of the untreated water and to determine treated optical properties of the treated water;
a processing unit coupled to the UV analysis module, wherein the processing unit is configured to determine whether the treated optical properties of the treated water exceed at least one threshold and to provide a impurity signal in response thereto, wherein the processing unit is configured to determine UV output parameters, in response to the initial optical properties of untreated water;
a UV disinfection module coupled to the processing unit, wherein the UV disinfection module is configured illuminate the untreated water with a UV light to reduce biological impurities from the untreated water and to form the treated water in response to the UV output parameters;
a reporting module coupled to the processing unit, wherein the reporting module is configured to output data comprising the initial optical properties of the untreated water and the treated optical properties of the treated water to a centralized server; and
a water output portion coupled to the processing unit, wherein the output portion is configured to allow output of the treated water, and wherein the output portion is configured to inhibit output of the treated water in response to the impurity signal; and
the centralized server coupled to each of the plurality of water quality monitoring devices, wherein the centralized monitoring unit is configured to receive the data from each of the plurality of water quality monitoring devices, wherein the centralized server is determine whether the initial optical properties of the untreated water exceeds initial level thresholds or determine whether the treated optical properties of the treated water exceed treated level thresholds and to generate an action signal in response thereto, and wherein the centralized server is configured to determine a corrective action in response to the action signal.

11. The system of claim 10 wherein the corrective action is selected from a group consisting of: increasing filtering of the untreated water, increasing levels of chemical additives to the untreated water.

12. The system of claim 11
wherein the corrective action is directed to only a portion of a water supply system associated with water quality monitoring devices indicating the impurity signal;
wherein the corrective action is selected from a group consisting of: increasing filtering of the untreated water, increasing levels of chemical additives to the untreated water.

13. The system of claim 10
wherein the centralized server is configured to compare the data to data previously gathered from the plurality of water quality monitoring devices to determine water quality trends; and
wherein the centralized server is configured to determine a corrective action in response to the water quality trends.

14. The system of claim 10 wherein the centralized server is configured to determine a corrective action in response to the action signal.

15. An apparatus for providing water comprises:
a water input portion configured to receive untreated water having impurities comprising biological impurities and particulates;
a water disinfection portion configured to receive the untreated water and to output treated water for human consumption comprising:
a filtering mechanism configured to filter particulates in the untreated water and to provide filtered water;
an analysis module configured to determine a quantity of remaining particulates in the filtered water; and to determine initial biological impurities in the filtered water;
a processing unit coupled to the analysis module, wherein the processing unit is configured to determine whether the quantity of remaining particulates in the filtered water is below a threshold and provide a pass condition or fail condition in response thereto, and wherein the processing unit is configured to determine UV output parameters in response to the initial biological impurities;
a UV disinfection module coupled to the processing unit, wherein the UV disinfection module is configured to provide UV light to the filtered water to reduce biological impurities from the filtered water and to form the treated water in response to the UV output parameters and in response to the pass condition and to provide the treated water;
a reporting module coupled to the processing unit, wherein the reporting module is configured to output the initial biological impurities to a remote monitoring server; and
a water output portion coupled to the processing unit, wherein the water output portion is configured to allow output of the treated water in response to the pass condition, and wherein the output portion is configured to inhibit output of the treated water in response to the fail condition.

16. The apparatus of claim 15 further comprising:
a water container configured to store the treated water;
a portable power supply configured to provide power to the water disinfection portion and the reporting module;
a housing coupled to the water container, wherein the housing is configured to house the water disinfection portion, the portable power supply, and the reporting module; and
wherein the housing is portable.

17. The apparatus of claim 15 wherein the reporting module comprises a wireless communication module selected from a group consisting of: a mobile telecommunications standard, Bluetooth, Wi-Fi, 802.11, NFC.

18. The apparatus of claim 1 wherein the UV disinfection module comprises UV LEDs configured to output UV light within a range of about 210 nm to about 400 nm.

19. The apparatus of claim 15 wherein the analysis comprises a UV light source and a UV sensor.

20. The apparatus of claim 15 further comprising a flow meter configured to monitor an amount of treated water output from the water output portion.

21. The apparatus of claim 15 further comprising:

a surface having a photocatalyzing material; and wherein the UV disinfection module is configured to direct UV light to the photocatalyzing material.

* * * * *